(12) United States Patent
Frew

(10) Patent No.: US 8,256,468 B1
(45) Date of Patent: Sep. 4, 2012

(54) METHODS AND APPARATUS FOR LINING A PASSAGEWAY

(76) Inventor: Timothy John Frew, Pittsburgh, PA (US)

( * ) Notice: Subject to any disclaimer, the term of this patent is extended or adjusted under 35 U.S.C. 154(b) by 607 days.

(21) Appl. No.: 12/401,545

(22) Filed: Mar. 10, 2009

Related U.S. Application Data

(60) Provisional application No. 61/068,857, filed on Mar. 10, 2008.

(51) Int. Cl.
*F16L 55/16* (2006.01)

(52) U.S. Cl. ...... 138/98; 138/97; 264/36.17; 405/150.1; 405/184.2; 156/287

(58) Field of Classification Search ............... 138/97, 138/98; 264/36.17; 156/287, 294; 405/150.1, 405/184.1, 184.2
See application file for complete search history.

(56) References Cited

U.S. PATENT DOCUMENTS

| | | | |
|---|---|---|---|
| 4,390,574 A | 6/1983 | Wood | 428/34.1 |
| 5,154,936 A | 10/1992 | Driver et al. | 425/182 |
| 5,167,901 A | 12/1992 | Driver et al. | 264/570 |
| 5,384,086 A | 1/1995 | Smith | 264/516 |
| 5,597,353 A | 1/1997 | Alexander, Jr. | 425/387.1 |
| 5,816,293 A | 10/1998 | Kiest, Jr. | 138/98 |
| 5,916,406 A | 6/1999 | Kamiyama et al. | 156/287 |
| 6,481,928 B1 * | 11/2002 | Doolaege | 405/115 |
| 6,682,668 B1 * | 1/2004 | Driver et al. | 264/35 |
| 6,899,832 B2 | 5/2005 | Wood | 264/36.17 |
| 7,025,580 B2 | 4/2006 | Heagy et al. | 425/11 |
| 7,051,766 B2 * | 5/2006 | Kamiyama et al. | 138/98 |
| 7,052,567 B1 * | 5/2006 | Blackmore et al. | 156/94 |
| 7,360,559 B2 | 4/2008 | Driver et al. | 138/98 |
| 7,402,030 B2 | 7/2008 | Kamiyama et al. | 425/11 |
| 2006/0090804 A1 * | 5/2006 | Driver et al. | 138/98 |
| 2006/0237083 A1 * | 10/2006 | Ward | 138/98 |
| 2007/0001330 A1 * | 1/2007 | Driver et al. | 264/36.17 |
| 2007/0114689 A1 | 5/2007 | Driver et al. | 264/36.17 |
| 2007/0261751 A1 * | 11/2007 | Lepola | 138/98 |
| 2008/0072982 A1 | 3/2008 | Driver et al. | 138/98 |

FOREIGN PATENT DOCUMENTS

| | | |
|---|---|---|
| CA | 2597348 A1 | 4/2007 |
| WO | WO 2007/044052 A3 | 4/2007 |

* cited by examiner

*Primary Examiner* — Patrick F Brinson
(74) *Attorney, Agent, or Firm* — Thorp Reed & Armstrong, LLP

(57) ABSTRACT

A method of forming a lining in a passageway, by placing or disposing or inverting or everting into the passageway a tube having a port and made from a material containing a curable resin so that the port passes at least partially through the passageway; and creating an opening in the tube to produce a flow path between the port and the inside of the tube. Additionally, inserting a pipe or hose into a conduit of the port; sealing the conduit around the pipe or hose, draining or exhausting fluid out from the inside of the tube through the port and the pipe or hose and/or circulating a fluid through the inside of the tube via the port and the pipe or hose may also be performed. A liner for insertion into a passageway, having a tube of one or more layers of resin absorbent material or curable resin material; and a port disposed on the tube wherein the port has a conduit with a first end attached to the tube and a second end unattached to the tube, wherein the conduit is disposed, at least in part, in or between the one or more layers of the tube.

11 Claims, 4 Drawing Sheets

METHODS AND APPARATUS FOR LINING A PASSAGEWAY

CROSS REFERENCE TO RELATED APPLICATIONS

This application claims the benefit of provisional patent application U.S. Ser. No. 61/068,857 filed Mar. 10, 2008, by the present inventor, which is incorporated by reference herein.

BACKGROUND

Field of the Disclosure

This invention relates to improved apparatus and methods for inversion and installation of a cured-in-place-pipe by fluid inversion and curing by hot fluid such as hot water, hot air, steam or other curing techniques such as curing by light. The methods and apparatus are particularly well suited for installing liners from about 12 to 36 inches to about 72 inches and greater.

It is generally well known that conduits or pipelines, particularly underground pipes, such as sanitary sewer pipes, storm sewer pipes, water lines and gas lines that are employed for conducting fluids frequently require repair due to fluid leakage or deterioration. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakage is undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor, energy and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. Some of the most successful pipeline repair or trenchless rehabilitation processes currently in wide use are described in U.S. Pat. Nos. 4,009,063, 4,064,211 and 4,135,958, all the contents of which are incorporated herein by reference.

According to such prior repair or trenchless rehabilitation processes, an elongated flexible tubular liner of a felt fabric, foam or similar resin impregnable material with an outer impermeable coating that has been impregnated with a thermosetting curable resin and is installed within the existing pipeline. Generally, the liner is installed utilizing an eversion process, as described in the later two identified patents. In the eversion process, radial pressure applied to the interior of an everted liner presses it against and into engagement with the inner surface of the pipeline. However, these prior repair or trenchless rehabilitation processes may also be practiced by pulling a resin impregnated liner into the conduit by a rope or cable and using a separate fluid impermeable inflation bladder or liner that is everted within the liner to cause the liner to cure against the inner wall of the existing pipeline. Such resin impregnated liners are generally referred to as "cured-in-place-pipes" or "CIPP liners" and the installation is referred to a CIPP installation.

The CIPP flexible tubular liners have an outer smooth layer of relatively flexible, substantially impermeable polymer coating the outside of the liner in its initial state. When everted, this impermeable layer ends up on the inside of the liner after the liner is everted during installation. As the flexible liner is installed in place within the pipeline, the pipeline is pressurized from within, preferably utilizing an eversion fluid, such as water or air to force the liner radially outwardly to engage and conform to the interior surface of the existing pipeline.

Typically, when everting a larger diameter liner for installation in a passageway, an eversion unit of some sort having a large cylindrical head or puncturing canister attached to the everted end of the liner after it has traveled through the passageway. Such large cylindrical heads or canisters are heavy, bulky and difficult to handle.

Accordingly, it would be desirable to provide methods and apparatus for use in the everting, installation and cure of a CIPP liner that does not require the use of large, heavy and bulky cylindrical heads or canisters.

These and other advantages of the invention will be appreciated by reference to the detailed description of the preferred embodiment(s) that follow.

SUMMARY OF THE INVENTION

In a first aspect, the present invention comprises a method of forming a lining in a passageway, comprising: placing or disposing or inverting or everting into the passageway a tube comprising a port and a material containing or comprising a curable resin so that the port passes at least partially through the passageway; and creating an opening in the tube to produce a flow path between the port and the inside of the tube. The creating an opening in the tube preferably is performed from inside of the conduit of the port. The method may further comprise: inserting a pipe or hose into a conduit of the port; sealing the conduit around the pipe or hose; draining or exhausting fluid out from the inside of the tube through the port and/or the pipe or hose; and/or circulating a fluid through the inside of the tube via the port and the pipe or hose.

In another aspect, the present invention comprises a method of forming a lining in a passageway, comprising: placing or disposing or inverting or everting into the passageway a tube comprising a plurality of layers of a material containing or comprising a curable resin; locating a port substantially disposed between two of the plurality of layers through an opening in one of the layers of the tube; extracting a conduit of the port through the opening and out from within the two layers of the tube; and creating an opening in the tube to produce a flow path between the port and the inside of the tube. The creating an opening in the tube preferably is performed from inside of the conduit of the port. The method may further comprise: inserting a pipe or hose into a conduit of the port; sealing the conduit around the pipe or hose; draining or exhausting fluid out from the inside of the tube through the port and/or the pipe or hose; and/or circulating a fluid through the inside of the tube via the port and the pipe or hose.

In a further aspect, the present invention comprises a liner for insertion into a passageway, comprising: a tube comprising one or more layers of resin absorbent material or curable resin material; and a port disposed on the tube wherein the port comprises a conduit having a first end attached to the tube and a second end unattached to the tube, wherein the conduit is disposed, at least in part, in or between the one or more layers of the tube. Preferably, the tube may have a cylindrical or a non-cylindrical shape. Also, each of the one or more layers of the tube and the conduit preferably are flexible and may be made from the same material, which may be a synthetic felt-like material.

In another aspect of the liner of the present invention, the tube preferably comprises first and second layers of resin absorbent material or curable resin material and a flange defined by the first end of the conduit attached to one or both of the first and second layers; and the conduit is substantially disposed between the first and second layers. Additionally, the liner may further comprise an opening defined by the first layer that comprises part of the port and provides access to the conduit disposed between the first and second layers, and a handle or cord attached to the conduit.

In yet an additional aspect of the present invention, the liner may further comprise a plurality of ports disposed on the tube wherein each of the ports comprises a conduit having a first end attached to the tube and a second end unattached to the tube. Preferably, the tube may comprise first and second layers of resin absorbent material or curable resin material and the first end of the conduit of each of the plurality of ports is attached to one or both of the first and second layers; and each of the conduits is substantially disposed between the first and second layers. Additionally, the liner may also comprise a plurality of openings defined by the first layer wherein each opening comprises part of one of the ports and provides access to its respective conduit substantially disposed between the first and second layers of the tube. Again, the liner may further comprise a handle or cord attached to the conduit of each port.

In another aspect of the liner of the present invention, the tube has a first end and a second end spaced apart from said first end; wherein one or more of the plurality of ports are disposed on the tube closer to its first end than to its second end; and wherein one or more of the plurality of ports are disposed on the tube closer to its second end than to its first end. Moreover, the tube preferably comprises first and second layers of resin absorbent material or curable resin material and the first end of the conduit of each of the plurality of ports is attached to one or both of the first and second layers; and one or more of the conduits are substantially disposed between the first and second layers. Also, at least one of the one or more ports disposed closer to the first end of the tube preferably has its conduit substantially disposed between the first and second layers.

BRIEF DESCRIPTION OF THE DRAWINGS

For the present disclosure to be easily understood and readily practiced, the present disclosure will now be described for purposes of illustration and not limitation in connection with the following figures, wherein.

DETAILED DESCRIPTION OF PREFERRED EMBODIMENT(S) OF THE INVENTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

Figure 1:
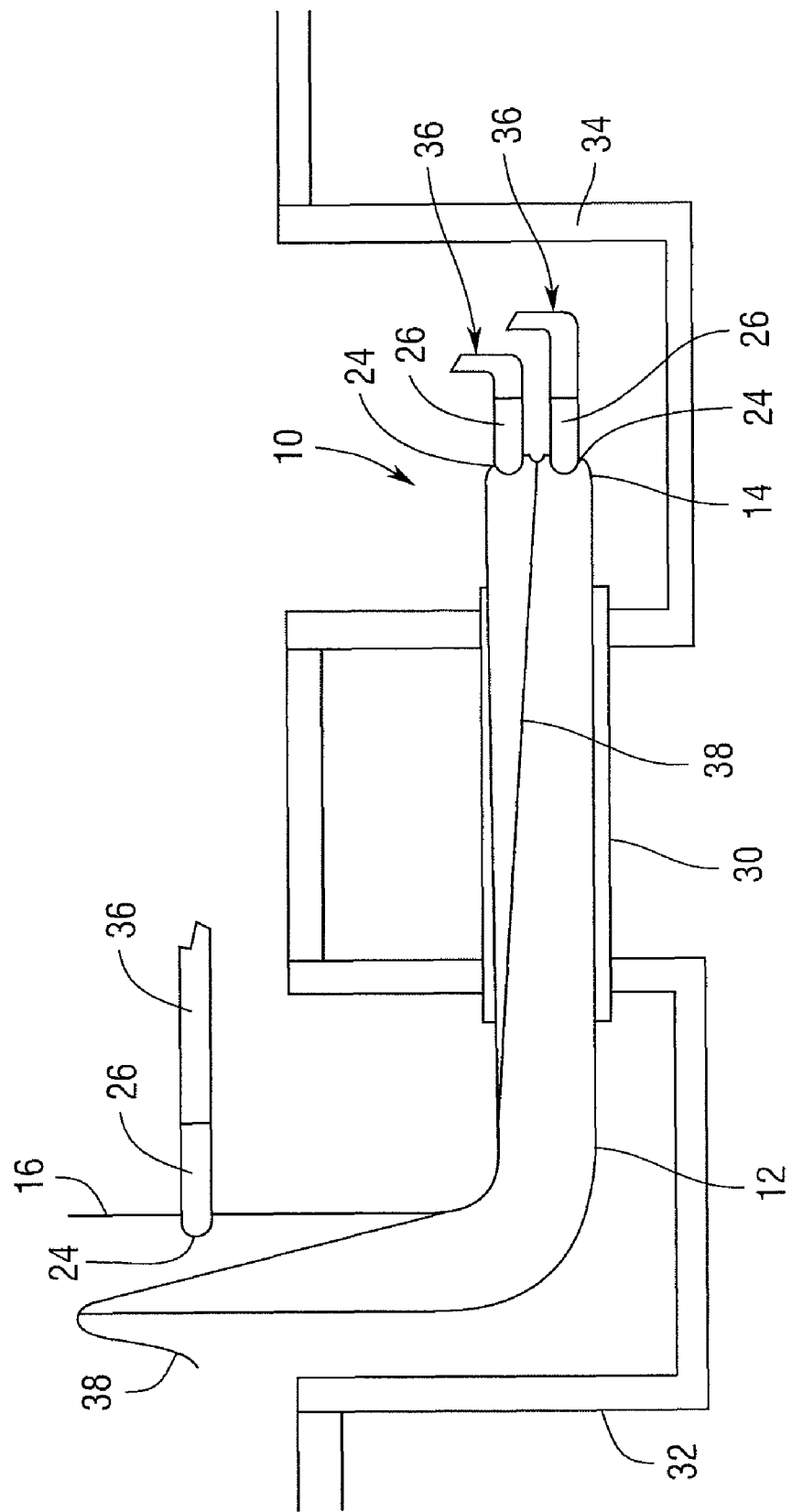
FIG. 1 is a side elevational view of a preferred liner of the present invention fully inverted in a pipe disposed between two manholes.
Figure 3:
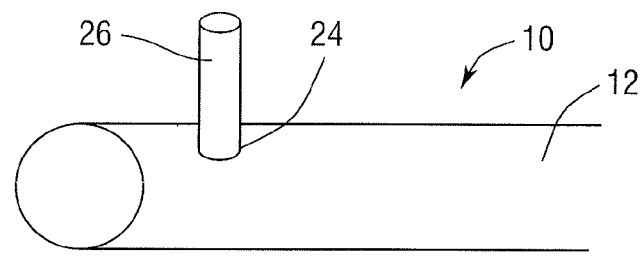
FIG. 3 is another partial perspective view of a preferred liner according to the present invention showing an integrated port of the liner and its conduit in its deployed and operational position.
Figure 3A:
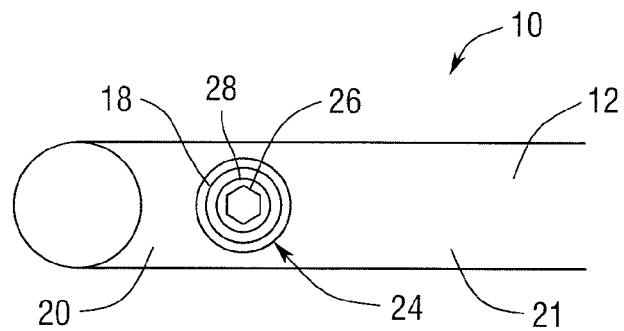
FIG. 3A is partial perspective and partial cut away view of a preferred liner according to the present invention showing the multiple layers of the tube and the integrated port of the liner and its conduit in its stowed position substantially disposed between two layers of the liner.

Referring now to the drawings wherein like reference numerals designate like or corresponding elements throughout the several views there is shown in FIG. 1 a liner 10 according to a preferred embodiment of the present invention comprising a tube 12 having a first end 14 and a second end 16. As shown in FIG. 3A, tube 12 preferably comprises a multi-layer construction having a first layer 18 and a second layer 20 of a flexible resin impregnable material, such as a synthetic felt material, with layer 20 having an outer impermeable polymer film layer 21. Felt layer 20 and film layer 21 are stitched along a seam line (not shown) to form tubular liner 10. A compatible thermoplastic film in a form of a tape or extruded material preferably is placed on or extruded over seam line in order to ensure the impermeability of liner 10. In the embodiment illustrated in FIG. 1 and used throughout this description, liner 10 includes an inner second felt layer 18 also stitched along a seam line (not shown) which is positioned at a point in the tube 12 other than the location of seam line in outer felt layer 20. Liner 10 has a leading, inverted end 14 with a continuous length stored in a refrigeration unit (not shown) to suppress early cure of the resin. Liner 10 is cut to a desired length after being pulled or everted into the existing pipeline 30 with this operation determining the trailing end 16 of liner 10. As shown in FIG. 1, pipeline 30 may run between two manholes 32 and 34.

Liner 10 of the type illustrated throughout the drawings is impermeable to water and air. This will allow use in an air or water eversion as described herein. However, in a pull in and inflate installation in accordance with the invention, the liner need only be sufficiently impermeable to allow for suitable wet out and retention of resin and to prevent damage to the liner as it is pulled into the existing pipeline 30.

For larger liner diameters, several layers of felt material may be used. Felt layers 18 and 20 may be natural or synthetic flexible resin absorbable or absorbent material, such as polyester or acrylic fibers. Impermeable film 21 in outer layer 20 may be a polyolefin, such as polyethylene or polypropylene, a vinyl polymer, such as polyvinyl chloride, or a polyurethane as is well known in the art. In the initial step in all trenchless rehabilitation installations, the existing pipeline 30 preferably is prepared by cleaning and videotaping.

Figure 2A:
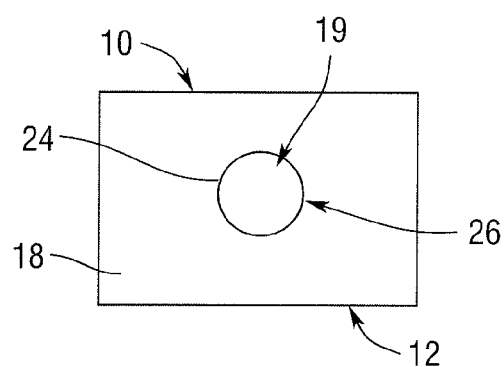
FIG. 2A is a top partial plan view of a preferred liner according to the present invention.
Figure 2B:
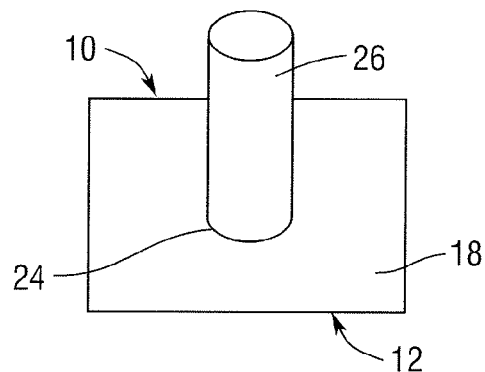
FIG. 2B is a partial perspective view of a preferred liner according to the present invention.

As shown in the drawings, liner 10 preferably includes one or more integrated ports 24 with each such port comprising a conduit 26 and a flange 28. Preferably, the flange 28 of conduit 26 is disposed between layers 18 and 20 via an opening 19 in layer 18 during manufacturing of liner 10. Conduit 26 and flange 28 preferably are made from the same material as layers 18 and 20 and may also include a polymer coating if desired. The conduit 26 and flange 28 may also be made from other suitable materials whether flexible or inflexible as desired, so long as such materials will not puncture or otherwise degrade the fluid impermeable nature of tube 12 during the manufacturing, wetting or lining processes. Flange 28 preferably is sewn, flame bonded or otherwise attached to one or both layers 18 and 20. Conduit 26 is then rolled upon itself (like a condom in a package) or folded so as to be as thin as possible as shown particularly in FIGS. 2A, 4A and 5, and fit in between the layers 18 and 20 of the liner 10 and opening 19 preferably is sized to accommodate such construction. Preferably, conduit 26 in such rolled or folded condition is substantially or completely disposed between the layers 18 and 20. Conduit 26, however, may be left to hang out on the outside or inside of tube 12, as desired.

The perspective of FIG. 3A is such that layer 18 comprises the inner layer of tube 12 and conduit 26 has been installed such that it would extend into tube 12 if not rolled back upon itself or folded and tucked in between layers 18 and 20. As shown in FIG. 1, port 24 can also be installed through an opening in layer 20 if such port 24 is going to be used near trailing end 16 or if the tube 12 is going to be pulled and not inverted or everted into a pipeline 30. Preferably, markings or indicia may be placed on the film layer 21 to indicate the location of ports 24 within the tube 12 so that the area of the tube 12 surrounding ports 24, which are typically near the ends 14 and 16, will not be wetted with resin during the resin impregnating process. The ports 24, however, may be installed anywhere on tube 12 as desired or required.

Prior to commencing installation pursuant to the method in accordance with the present invention, a curable thermosetting resin is impregnated into the felt of a liner 10 by a process referred to as "wet-out". The wet-out process generally involves injecting resin into felt layer or layers 18 and 20 of liner 10 through the end or an opening formed in impermeable film layer 21, drawing a vacuum and passing the impregnated liner through nip rollers as is well known in the lining art. One such procedure of this vacuum impregnation is described in U.S. Pat. No. 4,366,012, the contents of which are incorporated herein by reference. A wide variety of resins may be used, such as polyester, vinyl esters, epoxy resins and the like, which may be modified as desired. It is preferable to utilize a resin which is relatively stable at room temperature, but which cures readily when heated.

Figure 4A:
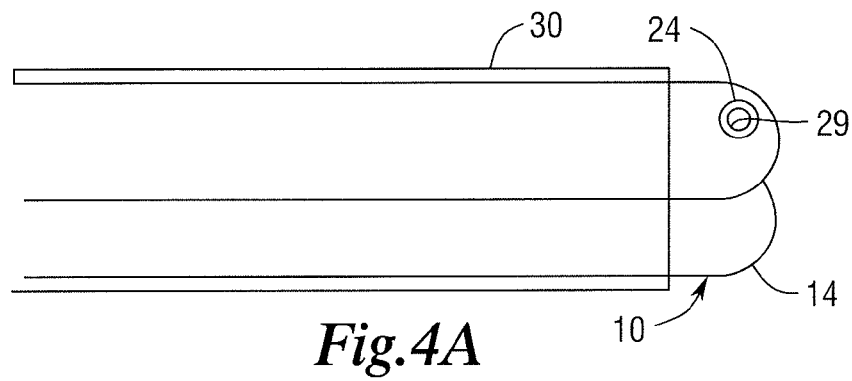
FIG. 4A is a side elevational view of a preferred liner according to the present invention showing the integrated port of the liner and its conduit in its stowed position substantially disposed between two layers of the liner and a handle or cord for pulling the conduit of the port into its deployed position.
Figure 4B:
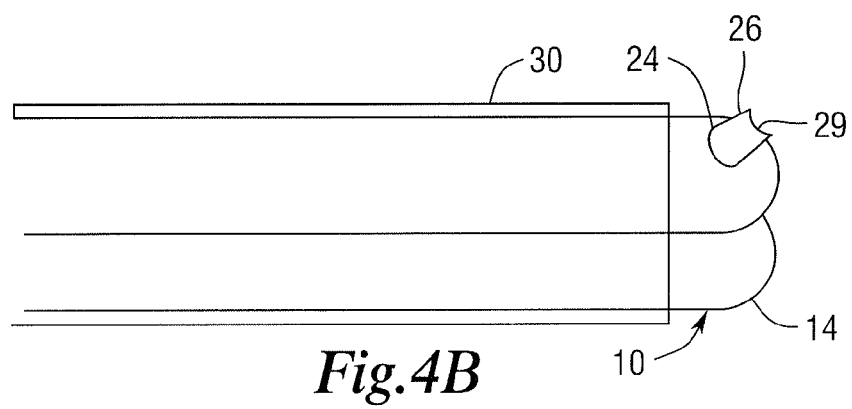
FIG. 4B is a side elevational view of a preferred liner according to the present invention showing the integrated port of the liner and its conduit in a partially deployed position and a handle or cord for pulling the conduit of the port into its deployed position.
Figure 5:
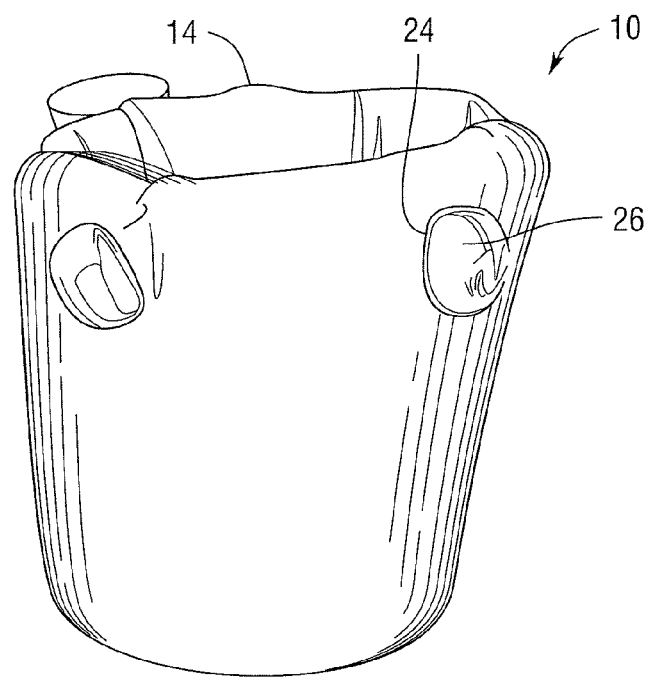
FIG. 5 is front perspective view of a preferred liner according to the present invention showing the everted end of the liner and the integrated port of the liner and its conduit in its stowed position substantially disposed between two layers of the liner.
Figure 6:
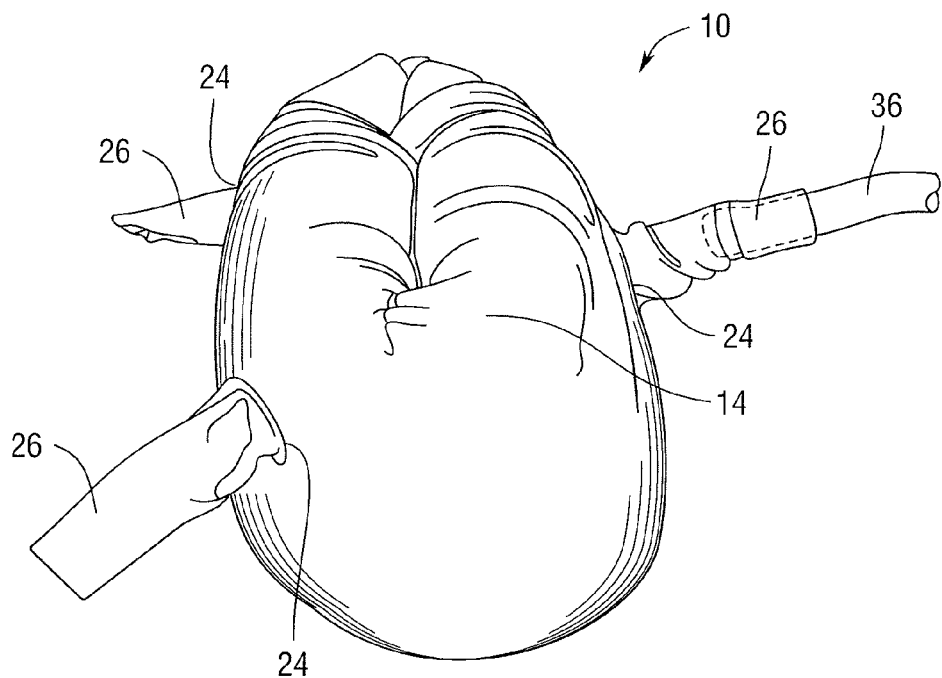
FIG. 6 is front perspective view of a preferred liner according to the present invention showing the everted end of the liner and a plurality of integrated ports of the liner and their conduits in their deployed position with one of the conduits sealed around a pipe or hose.

Referring to FIG. 1, installation of a CIPP liner 10 preferably is achieved by means of air inversion or water inversion. When initially installed in the host pipe 30, the liner 10 is flexible. The liner 10 is then cured to harden the liner 10 in place over the inner surface of host pipe 30. The liner 10 is cured and hardened with hot water, hot air, light or steam circulated or blown through the liner 10 which is inside the existing host pipe 30. Preferably, conduit 24 is a hollow felt tube that measures 2.5 inches in diameter by 1 foot long. Port 24 with conduit 26 is used to aid in the inversion and curing process of both hot water and steam cure processes. As the liner 10 is inverted and comes to the end of its length at 14 and exits host pipe 30, the inversion of liner 10 is stopped and preferably one or more ports 24 will be exposed now that layer 18 has been inverted outward. The conduits 26 of the exposed ports 24 then can be pulled out from within the layers 18 and 20 by hand, with or without the aid of a cord 29, handle or other means attached to conduit 26 as shown in FIGS. 4A and 4B. Such cord 29 or other means for extracting conduit 26 sandwiched between layers 18 and 20, which are under pressure from the fluid used in the everting process, preferably have rounded sides or edges so as not to puncture liner 10.

Figure 4C:
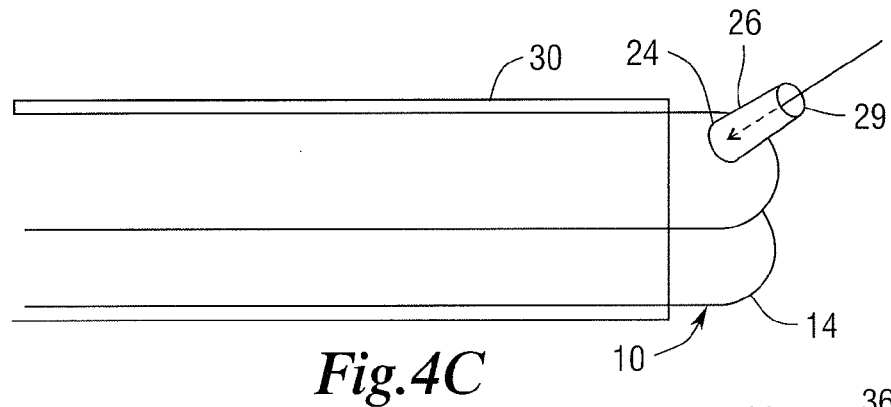
FIG. 4C is a side elevational view of a preferred liner according to the present invention showing the conduit of the integrated port of the liner in a fully deployed position with a reference arrow indicating the location for cutting through the liner via the inside of the conduit to create a flow path between the port and the inside of the liner.
Figure 4D:
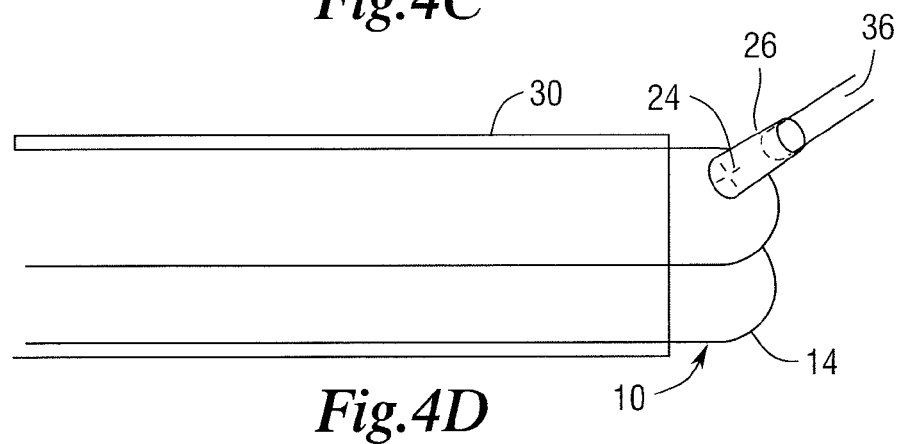
FIG. 4D is a side elevational view of a preferred liner according to the present invention showing the conduit of the integrated port of the liner in a fully deployed position and sealed around a pipe or hose for draining, exhausting or circulating fluid from or through the liner.

Next as shown in FIG. 4C, the tube 12 of liner 10 is cut or pierced by inserting a manual or powered knife, drill or sharp object in conduit 26 to create an opening in the flexible tube 12 to produce a flow path between the port 24 and the inside of the tube 12. Air or water that is inside the tube 12 can then exit via port 24 and conduit 26. As the air or water escape, an exhaust pipe or hose or circulation pipe or hose 36, such as for example a 2" pipe, can be inserted or installed into conduit 26 and clamped off or otherwise sealed thereon as shown in FIG. 4D. Once this is complete, pipe 36 is connected to a control device which controls the fluid pressure in the liner 10 to keep the liner 10 inflated against the walls of the host pipe 30 while the liner 10 is cured in place. The liner 10 is held in place by a rope 38 which keeps the liner from inverting open. Hot water, hot air or steam can then be expelled or recirculated through liner 10, ports 24 and conduits 26 using a B station or boiler truck to cure the resin in liner 10. After curing and cooling of the liner 10, the conduits 26 are cut off and discarded.

In the foregoing Detailed Description, various features are grouped together in a single embodiment to streamline the disclosure. This method of disclosure is not to be interpreted as reflecting an intention that the claimed embodiments of the invention require more features than are expressly recited in each claim Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of forming a lining in a passageway, comprising:
placing or disposing or inverting or everting into the passageway a tube comprising a port and a material containing or comprising a curable resin so that the port passes at least partially through the passageway;
creating an opening in the tube to produce a flow path between the port and the inside of the tube;
inserting a pipe or hose into a conduit of the port;
sealing the conduit around the pipe or hose; and
circulating a fluid through the inside of the tube via the port and the pipe or hose.

2. A method of forming a lining in a passageway, comprising:
placing or disposing or inverting or everting into the passageway a tube comprising a port and a material containing or comprising a curable resin so that the port passes at least partially through the passageway; and
creating an opening in the tube to produce a flow path between the port and the inside of the tube, wherein the creating an opening is performed from inside of a conduit of the port.

3. A method of forming a lining in a passageway, comprising:
placing or disposing or inverting or everting into the passageway a tube comprising a plurality of layers of a material containing or comprising a curable resin;
locating a port substantially disposed between two of the plurality of layers through an opening in one of the layers of the tube;
extracting a conduit of the port through the opening and out from within the two layers of the tube; and
creating an opening in the tube to produce a flow path between the port and the inside of the tube;
inserting a pipe or hose into the conduit of the port;
sealing the conduit around the pipe or hose; and
circulating a fluid through the inside of the tube via the port and the pipe or hose.

4. A method of forming a lining in a passageway, comprising:
placing or disposing or inverting or everting into the passageway a tube comprising a plurality of layers of a material containing or comprising a curable resin;
locating a port substantially disposed between two of the plurality of layers through an opening in one of the layers of the tube;
extracting a conduit of the port through the opening and out from within the two layers of the tube; and
creating an opening in the tube to produce a flow path between the port and the inside of the tube, wherein the creating an opening is performed from inside of the conduit of the port.

5. A liner for insertion into a passageway, comprising:
a tube comprising one or more layers of resin absorbent material or curable resin material;
a port disposed on the tube wherein the port comprises a conduit having a first end attached to the tube and a second end unattached to the tube, wherein the conduit is disposed, at least in part, in or between the one or more layers of the tube;
a handle or cord attached to the conduit;
wherein the tube comprises first and second layers of resin absorbent material or curable resin material and a flange defined by the first end of the conduit attached to one or both of the first and second layers; and
wherein the conduit is substantially disposed between the first and second layers.

6. A liner for insertion into a passageway, comprising:
a tube comprising one or more layers of resin absorbent material or curable resin material;
a plurality of ports disposed on the tube wherein each of the ports comprises a conduit having a first end attached to the tube and a second end unattached to the tube, wherein each conduit is disposed, at least in part, in or between the one or more layers of the tube; and
a handle or cord attached to the conduit of each port
wherein the tube comprises first and second layers of resin absorbent material or curable resin material and the first end of the conduit of each of the plurality of ports is attached to one or both of the first and second layers; and
wherein each of the conduits is substantially disposed between the first and second layers.

7. The liner of claim 6 further comprising
a plurality of openings defined by the first layer wherein each opening comprises part of one of the ports and provides access to its respective conduit substantially disposed between the first and second layers of the tube.

8. A liner for insertion into a passageway, comprising:
a tube comprising one or more layers of resin absorbent material or curable resin material;
a plurality of ports disposed on the tube wherein each of the ports comprises a conduit having a first end attached to the tube and a second end unattached to the tube, wherein each conduit is disposed, at least in part, in or between the one or more layers of the tube; and
a plurality of openings defined by the first layer wherein each opening comprises part of one of the ports and provides access to its respective conduit substantially disposed between the first and second layers of the tube;
wherein the tube comprises first and second layers of resin absorbent material or curable resin material and the first end of the conduit of each of the plurality of ports is attached to one or both of the first and second layers;
wherein each of the conduits is substantially disposed between the first and second layers wherein the tube has a first end and a second end spaced apart from said first end;
wherein one or more of the plurality of ports are disposed on the tube closer to its first end than to its second end; and
wherein one or more of the plurality of ports are disposed on the tube closer to its second end than to its first end.

9. A liner for insertion into a passageway, comprising;
a tube comprising one or more layers of resin absorbent material or curable resin material; and
a plurality of ports disposed on the tube wherein each of the ports comprises a conduit having a first end attached to the tube and a second end unattached to the tube, wherein each conduit is disposed, at least in part, in or between the one or more layers of the tube;
wherein the tube has a first end and a second end spaced apart from said first end;
wherein one or more of the plurality of ports are disposed on the tube closer to its first end than to its second end; and
wherein one or more of the plurality of ports are disposed on the tube closer to its second end than to its first end.

10. The liner of claim 9 wherein the tube comprises first and second layers of resin absorbent material or curable resin material and the first end of the conduit of each of the plurality of ports is attached to one or both of the first and second layers; and
   wherein one or more of the conduits are substantially disposed between the first and second layers.

11. The liner of claim 10 wherein at least one of the one or more ports disposed closer to the first end of the tube has its conduit substantially disposed between the first and second layers.

\* \* \* \* \*